(12) United States Patent
Shen et al.

(10) Patent No.: US 8,954,234 B2
(45) Date of Patent: Feb. 10, 2015

(54) ELECTRIC POWER STEERING SYSTEM

(75) Inventors: Lin Shen, Shenzhen (CN); Xiaojing Li, Shenzhen (CN); Shulin Liang, Shenzhen (CN); Jianhua Zhang, Shenzhen (CN)

(73) Assignee: BYD Co. Ltd., Shenzhen (CN)

( * ) Notice: Subject to any disclaimer, the term of this patent is extended or adjusted under 35 U.S.C. 154(b) by 689 days.

(21) Appl. No.: 12/946,184

(22) Filed: Nov. 15, 2010

(65) Prior Publication Data

US 2011/0130922 A1 Jun. 2, 2011

(30) Foreign Application Priority Data

Nov. 28, 2009 (CN) .......................... 2009 2 0260897

(51) Int. Cl.
*B62D 6/00* (2006.01)
*B62D 5/04* (2006.01)
(52) U.S. Cl.
CPC ..................................... *B62D 5/046* (2013.01)
USPC ............................................................ 701/41
(58) Field of Classification Search
CPC ................................... B62D 6/00; B62D 5/04
USPC ............................................ 701/41; 180/415
See application file for complete search history.

(56) References Cited

U.S. PATENT DOCUMENTS

| 6,465,991 B1 * | 10/2002 | Chang ........................... 323/222 |
| 2004/0196034 A1 * | 10/2004 | Hara et al. ..................... 324/251 |
| 2007/0043490 A1 | 2/2007 | Yokota et al. |

FOREIGN PATENT DOCUMENTS

| EP | 1 632 420 A2 | 3/2006 |
| EP | 2 127 997 A2 | 12/2009 |
| WO | WO 2009/138831 A1 | 11/2009 |

OTHER PUBLICATIONS

European Search Report for EP Application No. 10192658 dated Feb. 14, 2011, 6 pgs.

* cited by examiner

*Primary Examiner* — Fadey Jabr
*Assistant Examiner* — Martin Weeks
(74) *Attorney, Agent, or Firm* — Brinks Gilson & Lione

(57) ABSTRACT

An electric power steering system includes a power supply, a driving motor for supplying mechanical power, and an electric power steering controller configured to control the driving motor and provide power to the driving motor. A boosting module is operatively coupled between the power supply and the electric power steering controller and is configured to boost a power output of the power supply, and supply the boosted power output to the electric power steering controller so that the driving motor receives a boosted power level.

15 Claims, 2 Drawing Sheets

ELECTRIC POWER STEERING SYSTEM

CROSS-REFERENCE TO RELATED APPLICATIONS

The present application claims priority to and benefit of Chinese Patent Application No. 2009-20260897.6 filed on Nov. 28, 2009, the entirety of which is hereby incorporated by reference.

BACKGROUND

1. Technical Field

The present disclosure relates to an electric power steering system, more particularly to the electric power steering system including a boosting module.

2. Description of the Related Art

With quick development of the economy, the electric vehicle and hybrid electric vehicle are used as the new traffic tools. Comparing with the traditional fuel vehicle, due to lots of power battery packs and different driving systems are carried, the mass of the vehicle is quite large, which may have high requirement of the electric power steering system. As shown in FIG. 1, the electric power steering system comprises a 12V power supply 1a, an electric power steering controller 2a and a driving motor 3a. The electric power steering controller 2a is electrically coupled with the 12V power supply 1a and the driving motor 3a respectively. However, when the vehicle is in large-angle steering, it is needed to increase the output power of the driving motor 3a. Because the voltage is unable to increase and the value of the working current is restricted by the electric power steering controller 2a and the driving motor 3a, the current keeps constant until increased to a predetermined value. So that, the output power of the driving motor 3a may be insufficient. That means the output torsion of the driving motor 3a may be insufficient. If the output power of the electric power steering system is insufficient, the drivers may be difficult to steer the steering wheel.

SUMMARY

The present disclosure is directed to solve at least one of the problems in the prior art.

Accordingly, the present disclosure provides an electric power steering system which includes a driving motor having sufficient output power and is easy for the drivers to steer the steering wheel, to overcome the problem of the electric power steering system in the prior art, which includes the driving motor having insufficient output power to cause assistance of the steering wheel insufficient and the drivers are difficult to steer the steering wheel.

According to one embodiment of the present disclosure, an electric power steering system is disclosed which may comprise a supply power, an electric power steering controller for generating a control signal, a driving motor for supplying power according to the control signal of the electric power steering controller and a boosting module for boosting the power supply and supplying a boosted power to the electric power steering controller. The boosting module is respectively electrically coupled with the power supply and the electric power steering controller respectively. The electric power steering controller may be electrically coupled with the driving motor.

An electric power steering system includes a power supply, a driving motor for supplying mechanical power, and an electric power steering controller configured to control the driving motor and provide power to the driving motor. A boosting module is operatively coupled between the power supply and the electric power steering controller and is configured to boost a power output of the power supply, and supply the boosted power output to the electric power steering controller so that the driving motor receives a boosted power level.

According to an embodiment of the present disclosure, the boosting module may comprise a boosting drive unit for generating a driving signal and a boosting circuit unit for receiving the driving signal. The input end of the boosting circuit unit may be electrically coupled with the power supply and the output end of the boosting drive unit respectively. The output end of the boosting circuit unit may be electrically coupled with the input end of the electric power steering controller. The input end of the boosting drive unit may be electrically coupled with the power supply.

According to an embodiment of the present disclosure, the driving signal may comprise a first driving signal and a second driving signal. The electric levels of the first driving signal and the second driving signal may be opposite at the same time.

According to an embodiment of the present disclosure, the boosting driving unit may be UC3846 chip or TL494 chip.

According to an embodiment of the present disclosure, the boosting circuit unit may comprise a first boosting unit which may include a first energy-storage component for boosting voltage, a first switch component for receiving a first driving signal to be conductive. The first energy-storage component may be electrically coupled with the power supply and the first switch component respectively. The first switch component may be electrically coupled with the boosting drive unit and the electric power steering controller respectively.

According to an embodiment of the present disclosure, the boosting circuit unit may comprise a second boosting unit parallel to the first boosting unit. The second boosting unit may comprise a second energy-storage component for boosting the voltage and a second switch component for receiving the second driving signal to be conductive; the second energy-storage component is electrically coupled with the power supply and the second switch component respectively; the second switch component is electrically coupled with the boosting drive unit and the power steering controller respectively.

According to an embodiment of the present disclosure, the first energy-storage component and the second energy-storage component may be inductance.

According to an embodiment of the present disclosure, the first switch component and the second switch component may be MOSFET or IGBT.

According to an embodiment of the present disclosure, the boosting scope of the boosting module is about 15V to 24V.

As the boosting module is added to increase the voltage of the power supply, even if the current keeps constant, the voltage may be increased by the boosting module and the output power of the driving motor may be increased accordingly. Thereby, with the sufficient torsion from the driving motor, it is easy for the drivers to steer the steering wheel.

BRIEF DESCRIPTION OF THE DRAWINGS

These and other aspects and advantages of the invention will become apparent and more readily appreciated from the following descriptions taken in conjunction with the drawings in which.

DETAILED DESCRIPTION

These and other aspects, solutions and advantages of the disclosure will become apparent and more readily appreciated from the following descriptions taken in conjunction with the drawings, and the embodiments should be considered as an explanation instead of limitation to the disclosure.

Figure 1:
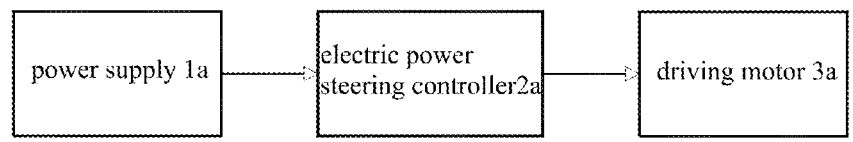
FIG. 1 shows a schematic diagram of an electric power steering system in the prior art.
Figure 2:
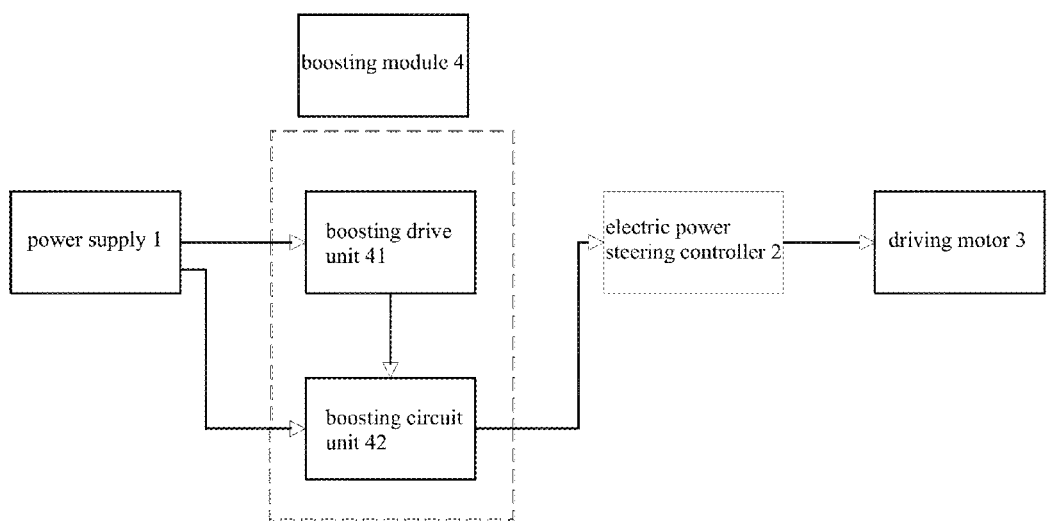
FIG. 2 shows a schematic diagram of an electric power steering system according to an embodiment of the present disclosure.

As shown in FIG. 2, the present disclosure provides an electric power steering system comprising a power supply 1, an electric power steering controller 2 for generating a control signal, a driving motor 3 for providing a power according to the control signal of the electric power steering controller 2 and a boosting module 4 for boosting the voltage of the power supply 1. The boosting module 4 is electrically coupled with the power supply 1 and the electric power steering controller 2 respectively. The electric power steering controller 2 is electrically coupled with the driving motor 3. Due to that the power supply for a vehicle is 12V, the voltage of the power supply for the electric power steering system is 12V, there is no need to add extra power supply. The boosting module 4 may increase the voltage of the power supply 1. The output end of the boosting module 4 may be electrically coupled with the electric power steering controller 2 to provide sufficient voltage to the electric power steering controller 2, so that, the electric power steering controller 2 may control the driving motor 3 according to the external driving signal that may supply sufficient output torsion to the steering system.

According to an embodiment of the present disclosure, the boosting module 4 may include a boosting driving unit 41 for generating a driving signal and a boosting circuit unit 42 for receiving the driving signal to boost voltage. The input end of the boosting circuit unit 42 may be electrically coupled with the power supply 1 and the boosting drive unit 41 respectively. The output end of the boosting circuit unit 42 may be electrically coupled with the input end of the electric power steering controller 2. The input end of the boosting drive unit 41 may be electrically coupled with the power supply 1.

According to an embodiment of the present disclosure, the driving signal may comprise a first driving signal and a second driving signal. The electric levels of the first driving signal and the second driving signal may be opposite at the same time. The boosting drive unit 41 may be a Current Mode PWM Controller, such as a UC3846 chip available from Texas Instruments or may be a Pulse Width Modulation Controller, such as a TL 494 chip, also available from Texas Instruments. Meanwhile, the boosting drive unit 41 may generate a driving signal. The driving signal may be converted by an inverter to form two kinds of driving signals with opposite electric levels at the same time.

According to an embodiment of the present disclosure, the boosting circuit unit 42 may comprise a first boosting unit which may include a first energy-storage component for boosting the voltage and a first switch component for receiving a first driving signal to be conductive. The first energy-storage component may be electrically coupled with the power supply 1 and the first switch component respectively. The first switch component may be electrically coupled with the boosting drive unit 41 and the electric power steering controller 2 respectively. When the first switch component is conductive, the first energy-storage component may store energy; when the first switch component is cut off, the first energy-storage component may generate electricity, that is the first energy-storage component and the power supply 1 may together supply voltage to the electric power steering controller 2 to increase the output voltage thereof.

According to an embodiment of the present disclosure, the boosting circuit unit 42 may further comprise a second boosting unit parallel to the first boosting unit. The second boosting unit may comprise a second energy-storage component for boosting voltage, a second switch component for receiving a second driving signal to be conductive. The second energy-storage component may be electrically coupled with the power supply 1 and the second switch component respectively. The second switch component may be electrically coupled with the boosting drive unit 41 and the electric power steering controller 2 respectively. The driving signals provided by the boosting drive unit 41 include two kinds of driving signals with opposite electric levels at the same time. When the first driving signal is at a high electric level, the first switch component may be conductive, and the first energy-storage component may store energy. When the second drive signal is at a low electric level, the second switch component may be cut off, and the second energy-storage component may generate electricity. That means, the first switch component and the second switch component may be conductive alternatively, then the first energy-storage component and the second energy-storage component may store energy and generate electricity alternatively, thereby the first energy-storage component and the second energy-storage component may be not broken easily. In the embodiment of the present disclosure, the first energy-storage component may be a first inductance L1 and the second energy-storage component may be a second inductance L2.

According to an embodiment of the present disclosure, the first switch unit and the second switch unit may be a MOSFET or IGBT, or other switching device. The first switch unit and the second switch unit may be a MOSFET or a IGBT, and also one may be a MOSFET, and the other may be a IGBT, only need that the driving signal received by the boosting drive unit 41 may be conductive alternatively.

Figure 3:
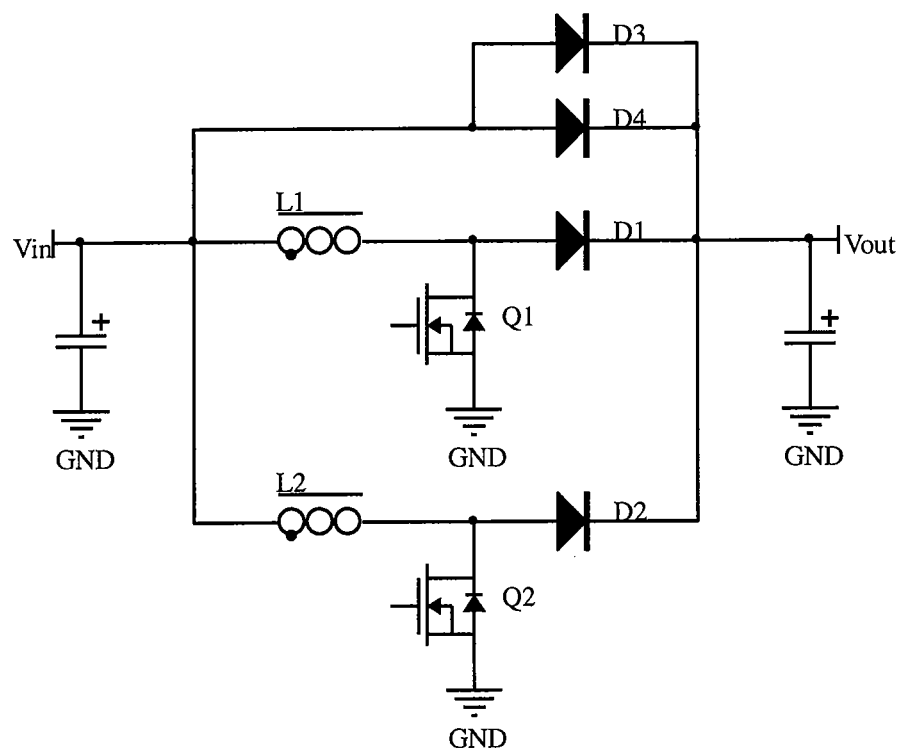
FIG. 3 shows a circuit diagram of a boosting circuit unit according to an embodiment of the present disclosure.

As shown in FIG. 3, a circuit diagram of the boosting circuit unit 42 is shown according to an embodiment of the present disclosure. The first switch unit of the present disclosure may be the first MOSFET Q1. The second switch unit may be the second MOSFET Q2. The boosting circuit unit 42 may comprise a first inductance L1, the input end of the first inductance L1 may be electrically coupled with the power supply Vin with the voltage 12V. The output end of the first inductance L1 may be electrically coupled with the drain electrode of the first MOSFET Q1 and the anode electrode of the diode D1. The gate electrode of the first MOSFET Q1 may be electrically coupled with the output end of the boosting drive unit 41, to receive the first driving signal from the boosting drive unit 41. The source electrode of the first MOSFET Q1 may be coupled to ground. The increased output voltage Vout may be outputted from the cathode electrode of the diode D1, supplied to the electric power steering controller 2. The boosting circuit unit 42 may further comprise a second inductance L2. The input end of the second inductance L2 may be electrically coupled with the input end of the first inductance L1, that is, coupled with the power supply Vin with the voltage 12V. The output end of the second inductance L2 may be electrically coupled with the drain electrode of the second MOSFET Q2 and the anode electrode of the diode D2. The gate electrode of the second MOSFET Q2 may be electrically coupled with the output end of the boosting drive unit 41, to receive the first driving signal of the boosting drive unit 41. The source electrode of the second MOSFET Q2 may be coupled to ground. The cathode electrode of the diode D2 may be electrically coupled with the cathode electrode of the diode D1, together to output the increased output voltage Vout. When the first MOSFET Q1 is conductive, the first inductance L1 may store energy, the second MOSFET Q2 may be cut off, the second inductance L2 may generate electricity and the increased output voltage Vout may be outputted via the diode D2. Due to that the output voltage Vin and the second inductance L2 may simultaneously supply voltage, the output voltage Vout is larger than the input voltage Vin. Meanwhile, when the second MOSFET Q2 is conductive, the second inductance L2 may store energy, the first MOSFET Q1 may be cut off, the first inductance L1 may generate electricity, thereby the first inductance L1 and the input voltage Vin may simultaneously supply voltage.

The failure of the first boosting unit of the boosting circuit unit 42 and the second boosting unit may cause an instance of no output. In the embodiment of the present disclosure, the input voltage Vin of the boosting circuit 42 may be further electrically coupled with the anode electrodes of the diodes D3 and D4 respectively; the cathode electrodes of the diodes D3 and D4 may be electrically coupled with the output voltage Vout. Due to the diodes D3 and D4 may not be used as the function of boosting voltage, just as ensuring the output, the output voltage Vout may be equal to the input voltage Vin.

At the moment of supplying electricity, due to the existence of the diodes D3 and D4, the output voltage Vout may be equal to the input voltage Vin, that is 12v. During the normal operation of the first boosting unit and second boosting unit, the output voltage Vout may be equal to the input voltage Vin/(1−D), wherein D is the duty ratio of the driving signal from the boosting drive unit 41, the range of D may be about 20% to 50% and the boosting voltage range of the boosting module may be about 15V to 24V.

In the embodiment, the electric power steering system may include a boosting module 4 for increasing the output voltage of the power supply 1. If the electric current keeps constant, the voltage may be increased to increase the output power of the driving motor 3. That means, the driving motor 3 may supply sufficient torsion to the steering system and thereby it is easy for drivers to steer the steering wheel.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. An electric power steering system comprising:
   a power supply;
   a driving motor for supplying mechanical power;
   an electric power steering controller configured to control the driving motor and provide power to the driving motor; and
   a boosting module operatively coupled between the power supply and the electric power steering controller, and configured to boost a power output of the power supply, and supply the boosted power output to the electric power steering controller so that the driving motor receives a boosted power level;
   the boosting module including:
      boosting drive unit configured to generate a driving signal providing a first phase driving signal and a second phase driving signal;
      a first energy-storage component operatively coupled to receive the first phase driving signal and controlled by a first switch component;
      a second energy-storage component operatively coupled to receive the second phase driving signal and controlled by a second switch component;
   wherein the first phase driving signal has a polarity opposite to that of the second phase driving signal;
   wherein when the second phase driving signal activates the second switch component, the second energy-storage component charges, and the first energy-storage component discharges through a first diode to provide energy to a load; and
   wherein when the first phase driving signal activates the first switch component, the first energy-storage component charges and the second energy-storage component discharges through a second diode to provide energy to the load.

2. The system of claim 1, wherein the boosting module further comprises:
   the boosting circuit unit configured to receive an output of the power supply, and configured to receive the first phase driving signal from the boosting drive unit, so as to boost a voltage level of an output voltage received by the driving motor; and
   the boosting circuit unit having an output electrically coupled to an input of the electric power steering controller.

3. The system of claim 2, wherein the driving signal comprises the first phase driving signal and the second phase driving signal, the first phase driving signal being in an on-state while the second phase driving signal is in an off-state, and the first phase driving signal being in an off-state while the second phase driving signal is in an on-state.

4. The system of claim 2, wherein the boosting drive unit is a single chip pulse width modulation controller or a single chip current mode pulse width modulation controller.

5. The system of claim 4, wherein the single chip controller is a UC3846 chip or a TL494 chip.

6. The system of claim 3, wherein the boosting circuit unit further comprises:
   a first boosting unit having a first energy-storage component electrically coupled to an output of the power supply and configured to boost an output voltage of the power supply;
   a first switching component configured to receive the first phase driving signal and to switch between a first state and a second state based on the first phase driving signal; and
   the first switch component providing the boosted output voltage from the first energy-storage device to the electric power steering controller when in the first state, and not providing the boosted output voltage from the first energy-storage device to the electric power steering controller when in the second state.

7. The system of claim 6, wherein the first switch component is conductive when in the first state and non-conductive when in the second state.

8. The system of claim 6, wherein the first switch component is non-conductive when in the first state and conductive when in the second state.

9. The system of claim 6, wherein the boosting circuit unit further comprises:
   a second boosting unit in parallel with the first boosting unit and having a second energy-storage component electrically coupled to an output of the power supply and configured to boost an output voltage of the power supply;

a second switching component configured to receive the second phase driving signal and to switch between a first state and a second state based on the second phase driving signal; and the second switch component providing the boosted output voltage from the second energy-storage device to the electric power steering controller when in the first state, and not providing the boosted output voltage from the second energy-storage device to the electric power steering controller when in the second state.

10. The system of claim 9, wherein the second switch component is conductive when in the first state and non-conductive when in the second state.

11. The system of claim 9, wherein the second switch component is non-conductive when in the first state and conductive when in the second state.

12. The system of claim 9, wherein the first energy-storage component and second energy-storage component are inductors.

13. The system of claim 9, wherein the first switch component and/or the second switch component is a metal oxide semiconductor field effect transistor (MOSFET) or an insulated-gate bipolar transistor (IGBT).

14. The system of claim 6, wherein boosting module boosts the output voltage to a voltage that ranges between 15 volts and 24 volts.

15. A method of boosting voltage to an electric power steering system having a power supply and a driving motor for supplying mechanical power, the method comprising:

providing electrical power to the driving motor by the power supply; and operatively coupling a boosting module between the power supply and the driving motor, the boosting module configured to boost a power output of the power supply and supply the boosted power output to the driving motor;

generating a driving signal having a first phase driving signal and a second phase driving signal;

providing the first phase drive signal to a first energy-storage component through a first switch;

providing the second phase drive signal to a second energy-storage component through a second switch;

activating the second switch with the second phase driving signal to cause the second energy-storage component to charge, and the first energy-storage component to discharge through a first diode to provide energy to a load; and activating the first switch with the first phase driving signal to cause the first energy-storage component to charge, and the second energy-storage component to discharge through a second diode to provide energy to the load; and wherein the first phase drive signal has a polarity opposite to that of the second phase driving signal so as to alternately activate and deactivate the first switch and the second switch, respectively.

* * * * *